Aug. 20, 1929.    T. L. FEENEY ET AL    1,725,574
DOWSER UNIT FOR MOTION PICTURE PROJECTING MACHINES
Filed March 3, 1927    3 Sheets-Sheet 1

WITNESSES:

INVENTORS
Thomas Louis Feeney &
Humbert Godoy
BY
Joshua R H Potts
ATTORNEY

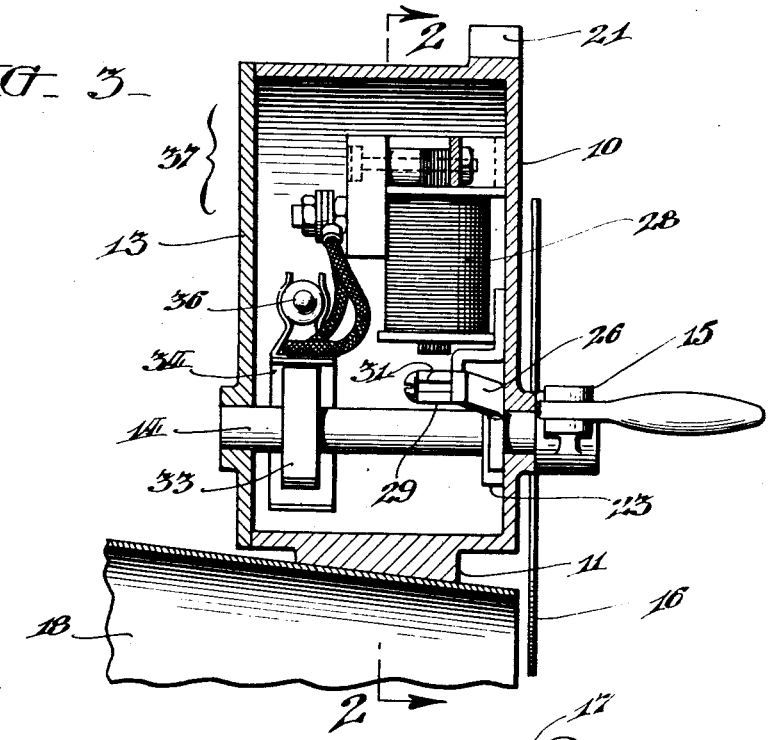
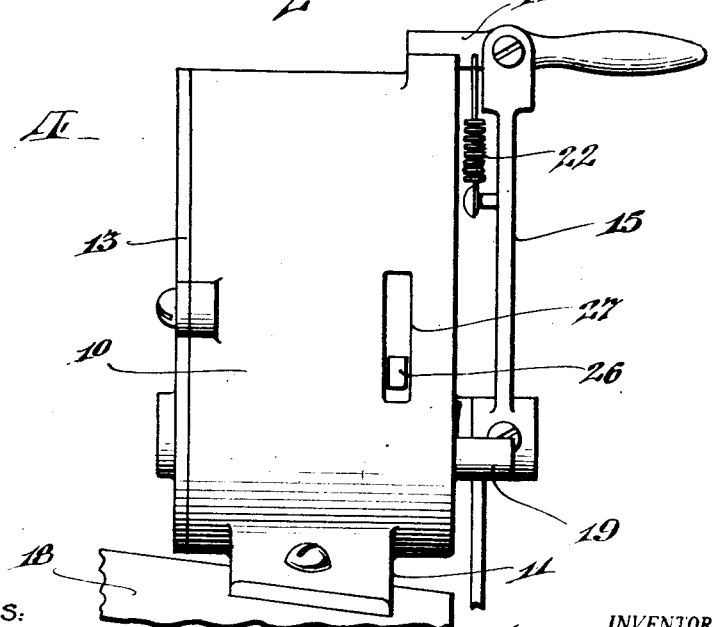

Aug. 20, 1929.  T. L. FEENEY ET AL  1,725,574
DOWSER UNIT FOR MOTION PICTURE PROJECTING MACHINES
Filed March 3, 1927    3 Sheets-Sheet 3

WITNESSES:

INVENTORS:
Thomas Louis Feeney &
Humbert Godoy,
BY
ATTORNEY

Patented Aug. 20, 1929.

1,725,574

UNITED STATES PATENT OFFICE.

THOMAS LOUIS FEENEY AND HUMBERT GODOY, OF PHILADELPHIA, PENNSYLVANIA, ASSIGNORS TO SENTRY SAFETY CONTROL CORPORATION, OF PHILADELPHIA, PENNSYLVANIA.

DOWSER UNIT FOR MOTION-PICTURE-PROJECTING MACHINES.

Application filed March 3, 1927. Serial No. 172,294.

Our invention relates to a dowser unit for intercepting the rays of light between the lamp and the film of a motion picture projecting machine, and more particularly to a unit of the general species described in Letters Patent 1,618,417 issued to us on February 22, 1927.

It is a well known fact that, if the motion picture film comes to a stop before the rays of light from the projector, the intense heat from such rays will cause it to explode. The object of this invention is to provide means for intercepting the rays of light between the lamp and the film in case the film should cease to move, regardless of whether the stopping of the film was caused by its breaking, the failure of power to the motor, or the breaking of the belt which drives the projecting mechanism.

We are aware that many attempts have been made to produce mechanism for preventing the film from catching fire but, to the best of our knowledge, none of such attempts were successful prior to our entering the field with the device described in the above mentioned patent.

In developing this dowser unit for commercial use, we produced certain refinements and improvements which are described hereinafter and illustrated in the accompanying drawings in which—

Figure 1:
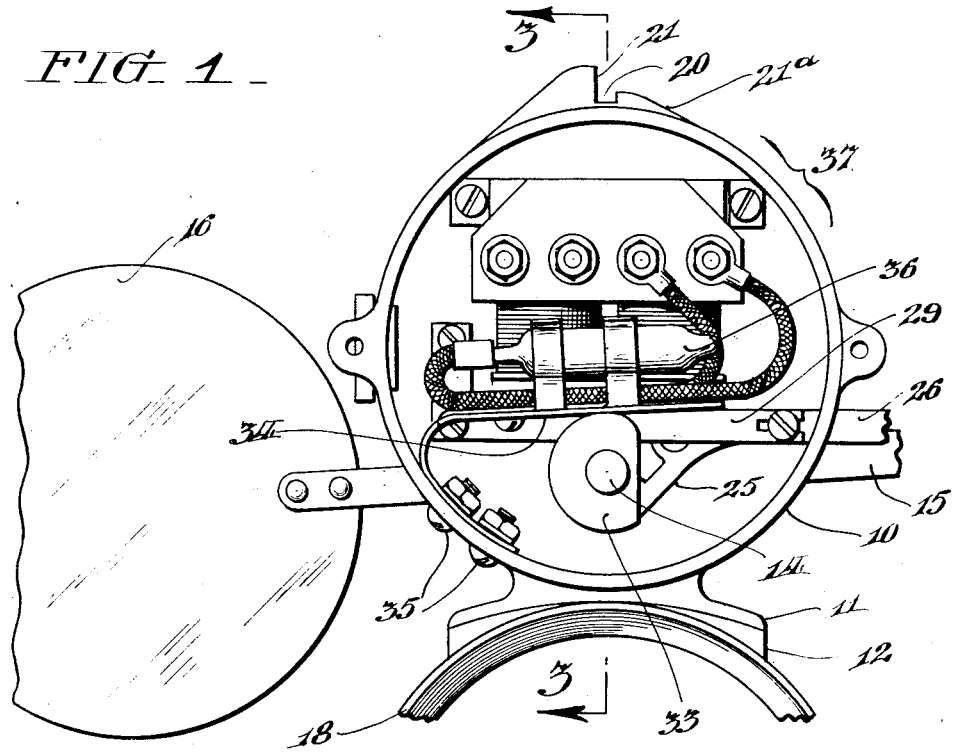

Figure 1 is a rear elevation of a unit embodying our invention, showing it mounted on a fragment of a motion picture projector; the cover of the case being removed and portions of the dowser plate and dowser handle being broken away.

Figure 2:
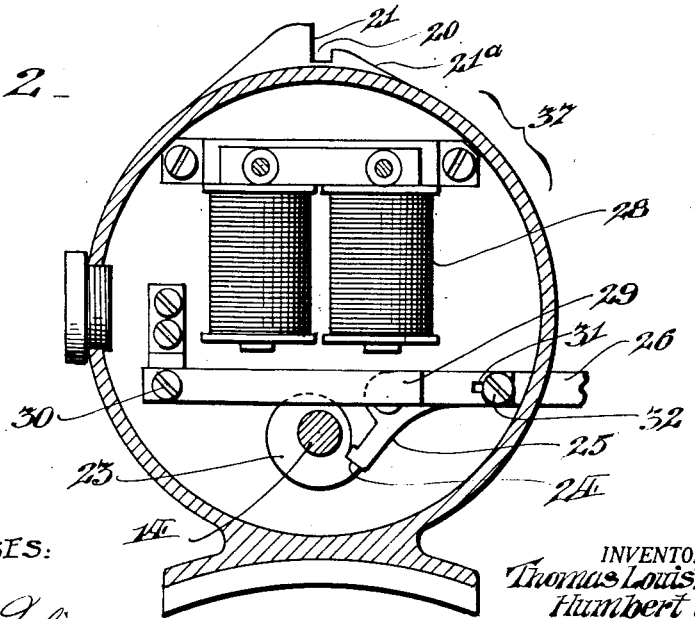
Figure 5:
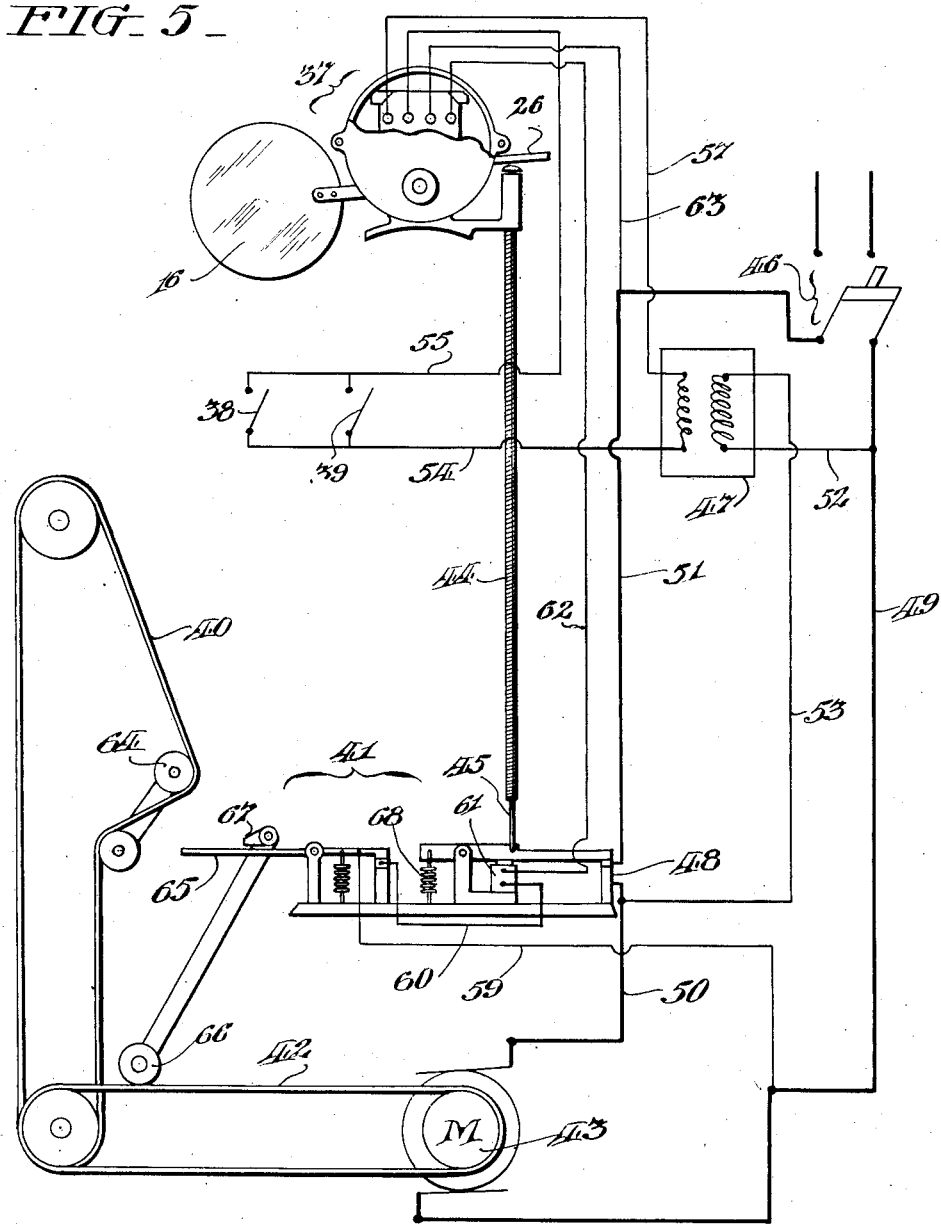

Figure 2 is a cross-sectional view taken substantially on line 2—2 on Figure 3; the dowser and the fragment of a motion picture projector being omitted, Figure 3 is a cross sectional view, taken on line 3—3 on Figure 1, Figure 4 is a side elevation of the device shown in Figure 1 showing the dowser handle as it would appear when the dowser plate, which has been omitted, was in operative position, and Figure 5 a wiring diagram.

Referring now more in detail to the drawings, the dowser unit has a casing 10 which is provided with a base 11, the under side of which is curved to fit one size of projecting machine cone and we provide fillers 12, the upper sides of which conform to the curvature of base 11, and their under sides conform to the curvature of the cone on which the device is to be mounted. In this manner, one device is adapted to be mounted on any projecting machine regardless of the shape or size of its cone. A cover 13 closes the open side of casing 10 and is secured thereto in any suitable manner.

A shaft 14, rotatably mounted in cover 13 and casing 10, has a dowser handle 15 fixed on its outer end and a dowser plate 16 is rigidly secured to its one end and a latch 17 pivotally mounted in the other end. The outer end of latch 17 functions as a hand grip by means of which the dowser may be moved from light obstructing position to a position clear of the opening in the cone 18 on which casing 10 is mounted; the operator being prevented from raising dowser plate beyond a certain position by a stud 19 fixed to casing 10 and adapted to abut handle 15.

When dowser plate 16 falls, in the manner to be later described, it is prevented from swinging beyond the opening of cone 18 by latch 17 engaging a notch 20 formed on the top of casing 10; one side 21 of notch 20 being of greater height than the other and latch 17 being drawn downwardly by a tension spring 22 so that, as dowser plate 16 falls, latch 17 will ride up the inclined surface 21ª of the shorter side of notch 20, contact with the opposite side of notch 20 and be drawn into the notch by the action of spring 22.

The dowser plate 16 is held out of light obstructing position by means of a collar 23, rigidly secured to shaft 14 and having a notch 24 which is engaged by one end of a latch 25 pivotally mounted on casing 10 and having its other end 26 extending outwardly through a slot 27 formed in the side of casing 10. It is evident that raising end 26 will move the end of latch 25 from notch 24 and allow dowser plate 16 to fall.

An electro magnet 28 is mounted in the upper half of casing 10 and adapted to attract an armature 29 disposed immediately below the magnet and hinged to the casing at 30; its other end being provided with a slot 31 which straddles a stud 32 fixed in latch 25. Energizing magnet 28 will cause it to attract armature 29 which will raise latch 25 out of notch 24 and allow dowser plate 16 to fall.

A cam 33 is fixed on shaft 14 and adapted, when the shaft is rotated by the falling of dowser plate 16, to engage the under side of a spring bearing 34 and elevate same. One end of spring bearing 34 is curved downwardly and secured to casing 10 in any suitable manner, as by bolts 35, while a mercury switch 36 is mounted on its upper side immediately above cam 33 and disposed at such an angle that the mercury in the switch is in contact with the switch points when dowser plate 16 is out of light obstructing position. As dowser plate 16 falls, cam 33 will be rotated and allow spring bearing 34 to move downwardly, thus lowering one end of mercury switch 36, and causing the mercury therein to move away from its switch points and open the circuit into which it is connected.

Referring now more particularly to Figure 5, 37 represents the device as a whole; 38 and 39, switches adapted to be actuated by the breaking of the film; 40, a belt on the projecting machine; 41, a switch adapted to be actuated by the breaking of belts 40 or 42; 43, a motor for driving the projector through belts 40 and 42; and 44, a flexible cable carrying a wire 45 which has one end attached to switch 41 and its other end disposed immediately below end 26 of latch 25. The construction of switch 41 and the function of wire 45 is described and claimed in our Patent No. 1,658,594, dated February 7, 1928. 46 represents a switch through which power is admitted from an outside source of supply to the motor circuit; 47 a transformer, and 48 a switch attached to switch 41.

The motor circuit, shown in heavy lines, consists of a wire 49, connecting motor 43 to switch 46, a wire 50, connecting motor 43 to switch 48, and a wire 51, connecting switch 48 to switch 46. A wire 52 connects one end of the primary coil of transformer 47 to wire 49 and wire 53 connects its other end to wire 50, thus putting the primary of the transformer in parallel with motor 43. It is evident that when the motor circuit is closed, a current will be induced in the secondary of transformer 47 when the secondary circuit is closed.

A wire 54 connects one end of the secondary winding of transformer 47 to switches 38 and 39 while a wire 55 connects the other side of switches 38 and 39 to one end of the winding on magnet 28 and a wire 57 connects the other end of the winding to the opposite end of the secondary winding of transformer 47. It is thus evident that closing either switch 38 or switch 39 will attract armature 29 and cause dowser plate 16 to fall into operative position.

A wire 59 connects one side of switch 41 to wire 49 and a wire 60 connects the other side of switch 41 to one end of the winding on electromagnet 61. A wire 62 connects the other end of the winding on magnet 61 to one side of mercury switch 36, and a wire 63 connects the opposite side of this switch to wire 51.

Should belt 40 break, a roller 64 will fall onto the end of a lever 65 and open switch 41. Should belt 42 break, roller 66 will fall and cause cam 67 to engage lever 65 and open switch 41. The opening of switch 41 will deenergize magnet 61 and allow a spring 68 to force wire 45 upwardly against end 26 of trip 25, as fully described in our copending application, as well as opening switch 48 and thus stopping motor 43. Should the power being supplied motor 43 be interrupted, magnet 61 will be deenergized and allow spring 68 to open switch 48 and to trip the dowser.

As previously explained, mercury switch 36 is so positioned that the falling of dowser 16 will move the mercury away from the switch points and break the circuit at this point; this will deenergize magnet 61 and allow spring 68 to open switch 48 and break the motor circuit at this point; thus cutting the power from all the apparatus in this installation.

With this arrangement of apparatus, the rays of light from the lamp in the motion picture projector will be intercepted by dowser 16 whenever the film ceases to move regardless of whether the power to the motor fails, a belt breaks, or the film breaks or clogs either above or below the projector.

The dowser unit illustrated may be modified and changed in various ways without departing from the invention herein set forth and hereafter claimed.

We claim:

1. A dowser unit comprising a casing; a shaft rotatable in the casing; a handle fixed to the shaft; a dowser fixed to one end of the handle; a spring urged latch on the other end of the handle; a large lug on the casing; a small lug spaced from the large lug, a sloping face on the small lug, a notched collar on the shaft, a trip engaging the notched collar for holding the dowser out of light obstructing position, and means for releasing the trip whereby the dowser will fall into light obstructing position and cause the latch to ascend the sloping face of the small lug and be drawn between the two lugs for locking the dowser in light obstructing position.

2. A device of the character described including a casing; a shaft rotatable in the casing; a dowser fixed to the shaft and adapted to fall into operative position; a notched collar on the shaft; a trip, pivoted to the casing, having one end adapted to engage the notched collar and having its other end extending outside the casing; a stud in the trip; a magnet armature having one end pivoted to the casing and a fork formed in its other end and straddling the stud, whereby the weight of the armature and of the outer end of the trip will cause said trip to engage the notched collar and hold the dowser in inoperative position; an electromagnet mounted in the casing and adapted to attract the armature and actuate the trip, and means for energizing the magnet.

3. A device of the character described including a casing, a shaft rotatable in the casing, a dowser fixed to the shaft and adapted to fall into operative position, a notched collar on the shaft, a trip engaging the notched collar for holding the dowser in inoperative position, an electromagnet mounted in the casing and adapted to actuate the trip, means for energizing the electromagnet, a cam fixed on the shaft, and a switch mounted above the cam and adapted to be operated by the rotation of said cam.

4. A device of the character described including a casing, a shaft rotatable in the casing, a dowser fixed to the shaft and adapted to fall into operative position, a notched collar on the shaft, a trip engaging the notched collar for holding the dowser in inoperative position, an electromagnet mounted in the casing and adapted to actuate the trip, means for energizing the electromagnet, a cam fixed on the shaft, a spring bearing fixed to the casing and engaging the cam, and a mercury switch mounted on the bearing and adapted to be operated by the rotation of said cam.

5. In combination with a motion picture projector, its film, motor, motor circuit and lamp; fire preventing apparatus including a device having a casing, a shaft rotatable therein, a dowser fixed on the shaft and adapted to swing into a position between the film and the lamp, a notched collar on the shaft, a trip engaging the collar, an electromagnet adapted to actuate the trip, a cam on the shaft, and a switch adapted to be operated by the cam and connected in parallel with the motor; a relay switch connected in series with the motor and said switch and having its relay also in series with said switch; a switch, adapted to be operated by the breaking of the film, connected with the electromagnet; and means to furnish electric power to the motor and magnet.

6. In combination with a motion picture projector, its film, motor, motor circuit and lamp; fire preventing apparatus including a device having a casing, a shaft rotatable therein, a dowser fixed on the shaft and adapted to swing into a position between the film and the lamp, a notched collar on the shaft, a trip engaging the collar, an electromagnet adapted to actuate the trip, a cam on the shaft, and a switch adapted to be operated by the cam and connected in parallel with the motor; a relay switch connected in series with the motor and said switch and having its relay also in series with said switch; a switch, adapted to be operated by the breaking of the film, connected with the electromagnet; and a transformer having its primary in parallel with the motor and its secondary in series with the electromagnet and the film actuated switch.

In witness whereof we have signed our names to this specification.

THOMAS L. FEENEY.
HUMBERT GODOY.